United States Patent [19]

Müller et al.

[11] Patent Number: 5,082,378
[45] Date of Patent: Jan. 21, 1992

[54] OPTICAL FIBER CONNECTOR AND METHOD FOR ITS MANUFACTURE

[75] Inventors: Emmerich Müller, Finkenweg; Michael Fleischer-Reumann, Marderweg, both of Fed. Rep. of Germany

[73] Assignee: Hewlett-Packard Company, Palo Alto, Calif.

[21] Appl. No.: 568,098

[22] Filed: Aug. 16, 1990

[30] Foreign Application Priority Data

Sep. 27, 1989 [EP] European Pat. Off. ........ 89117799.0

[51] Int. Cl.⁵ .............................................. G02B 6/38
[52] U.S. Cl. ........................................ 385/72; 385/70; 385/85
[58] Field of Search ............... 350/96.21, 96.20, 96.22, 350/96.23

[56] References Cited

U.S. PATENT DOCUMENTS

| | | | |
|---|---|---|---|
| 4,087,158 | 5/1978 | Lewis et al. | 350/96.21 |
| 4,735,480 | 4/1988 | Levinson et al. | 350/96.21 |
| 4,787,701 | 11/1988 | Stenger et al. | 350/96.21 |
| 4,818,061 | 4/1989 | Iwano et al. | 350/96.21 |
| 4,839,993 | 6/1989 | Masuko et al. | 51/129 |
| 4,852,963 | 8/1989 | Lampert | 350/96.21 |
| 4,919,509 | 4/1990 | Miller et al. | 350/96.21 |
| 4,953,941 | 9/1990 | Takahashi | 350/96.21 |
| 4,978,193 | 12/1990 | Tomita | 350/96.20 X |

FOREIGN PATENT DOCUMENTS

| | | |
|---|---|---|
| 56-37671 | 9/1982 | Japan . |
| 57-156159 | 9/1982 | Japan . |
| 59-38707 | 3/1984 | Japan . |
| 59-74519 | 4/1984 | Japan . |

Primary Examiner—John D. Lee
Assistant Examiner—Phan T. Heartney
Attorney, Agent, or Firm—Woodcock Washburn Kurtz Mackiewicz & Norris

[57] ABSTRACT

An optical fiber connector for joining optical fibers comprises a cylindrical ferrule (1) with a fiber (20) arranged along the axis of the ferrule and with an end face (23) of the fiber (20) inclined with respect to a plane perpendicular to the fiber axis (10). The fiber end face (23) is set back a predetermined distance from a projecting surface (22) of the ferrule end face. This projecting surface (22) acts as a bearing surface for an opposite connector so that two connectors can be brought into physical contact whereby a well-defined distance between the fiber end faces is maintained. In the connected state, the fiber end faces of two opposite connectors are arranged parallel to each other, thus ensuring high return loss of the connector system. The connector can easily be manufactured by a polishing process from a standard connector having ferrule and fiber end faces parallel to the fiber axis. (FIG. 2a: side view; FIG. 2c: top view).

10 Claims, 4 Drawing Sheets

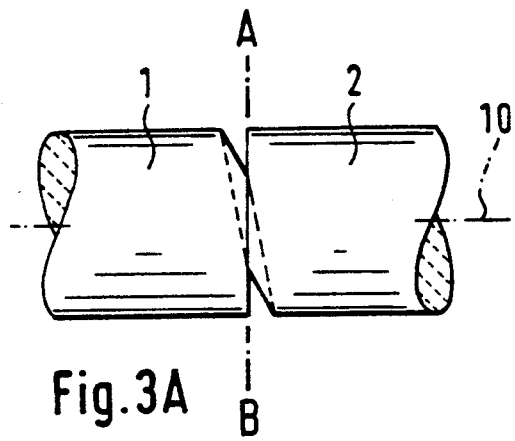
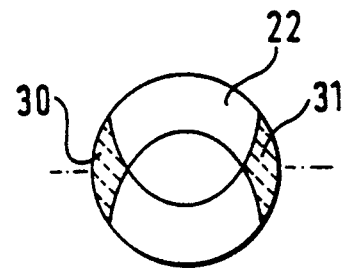
Fig. 3A  Fig. 3B
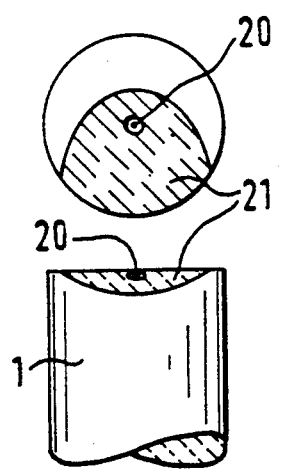
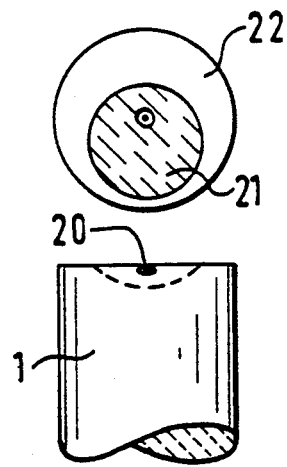
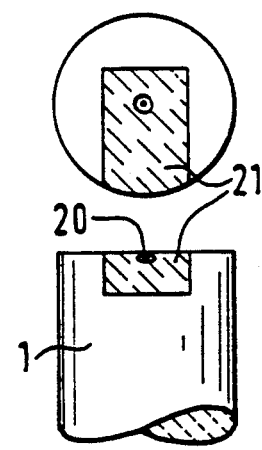
Fig. 4A  Fig. 4B  Fig. 4C

5,082,378

OPTICAL FIBER CONNECTOR AND METHOD FOR ITS MANUFACTURE

BACKGROUND OF THE INVENTION

The invention relates to an optical fiber connector wherein the optical fiber within the connector is surrounded by a ferrule. Such a connector is used for detachably joining ends of optical fibers such that light emerging from the end of one fiber is coupled into an opposite fiber with as much efficiency as possible. The invention also relates to a method for manufacturing such a connector.

Due to refractive index steps at the fiber ends there may be unwanted light reflections in the coupling region of the fibers. Light leaving a fiber may for example be reflected at such an interface back into the fiber and cause various disturbances in the fiber optic system of which the fiber is a part. This return radiation can be especially troublesome in systems wherein measuring or data signals are transmitted along the fibers. It is therefore desirable to have fiber optical connectors wherein such returning light does not occur, i.e., to have connectors with high return loss. Particularly, modern fiber optical communication systems require fiber optic connectors with high return loss.

As a result of the efforts to achieve high return loss, three different types of fiber optical connectors have been developed:

According to a first approach, the endfaces of the two connectors (i.e., the fiber and ferrule endfaces) are arranged perpendicularly with respect to the longitudinal axis of the fiber and the end faces of the two opposite fibers are in contact with each other. According to a second type of connectors, the opposite fiber end faces are spaced apart and the gap between the end faces is filled with index matching fluid to avoid glass-to-air transitions which would cause reflections. In a third approach, the endfaces of both connectors are inclined under a certain angle with respect to the connector axis and the two connectors are joined together such that the fiber end faces are not in contact with each other. Although reflections from the glass-to-air transitions occur, they are reflected back into the glass at an angle which is greater than the acceptance angle of the fiber core. Therefore, reflected light is stripped from the fiber and does not influence the performance of the fiber link.

Among the above mentioned three alternatives, the third typically has good performance characteristics regarding return loss. Such connectors, however, are difficult to manufacture and lack compatibility with the very common fiber connection systems with 2.5 mm ferrule diameter. In particular, since the width of the air gap between the two fiber end faces has to be precisely maintained, the connector has to be furnished with additional mechanical parts which permit the very exact adjustment of the required distance between the opposite fibers. The known connector thus becomes mechanically complex with great demands on the manufacturing tolerances of the used parts.

SUMMARY OF THE INVENTION

This invention as defined in the appended claims provide an optical fiber connector with high return loss which has a less complex design and which is easy to manufacture and a particularly advantageous method for manufacturing such a connector.

According to an underlying principle of the invention, the ferrule end face of the connector projects from the end face of the optical fiber and the projecting part is designed such that it forms a bearing surface for the opposite connector. In that way, the two connectors can be brought into direct physical contact and yet the fiber end faces have a predetermined distance from each other. Due to this distance and the inclination of the fiber end faces, it is ensured that light reflected at the fiber end faces is not coupled again into the fibers. Since the two connectors contact each other, the distance between the fiber end faces is accurately maintained without requiring mechanically complex spacing arrangements as in the prior art.

A connector according to the invention can easily be produced from a connector having a cylindrical ferrule and a fiber end face perpendicular to the fiber axis, such as the commercially available 2.5 mm ferrule diameter connectors: Such a connector is polished by a suitable polishing tool to remove a part of the ferrule and fiber end regions so that a projecting portion of the ferrule acting as the bearing surface and an inclined fiber end face remain. In a preferred embodiment, the projecting portion is a part of the original ferrule end face (perpendicular to the fiber axis) and comprises at least 50% of the perimeter of the original ferrule. The process of the invention can be employed with any standard cylindrical fiber connector modifying it into a high return loss connector. No extra parts are necessary. The polishing process is very simple and does not require extensive tooling.

Two connectors of the invention can be arranged opposite and in direct contact with each other, with the fiber end faces being parallel to each other and having a well-defined air gap in between, thus forming a fiber optical link with high return loss. The invention permits one to use standard connector components, for example standard connector receptacles with keys to hold the two connectors in a fixed angular and axial relationship. A connector of the invention is also compatible with standard connectors and suffers only from a minor degradation in insertion loss when connected thereto. A further advantage of the invention is that an open end connector needs no termination or mating connector to achieve high return loss.

The invention thus provides a versatile, easy-to-manufacture connector with high return loss. Since there is no physical contact of the fiber end faces, the connector has higher lifetime and reliability than connectors with direct contact of the fibers. The distance between the fiber end faces and the angles thereof can be easily controlled by choosing proper polishing parameters without necessitating spacing parts.

BRIEF DESCRIPTION OF THE DRAWINGS

Subsequently, embodiments of the invention are explained in more detail with reference to the drawings:

FIG. 2c is a top view on the piece shown in FIG. 2a.

FIG. 3a is a side view of the two mated ferrule end pieces of the connector system shown in FIG. 1a.

FIG. 3b is a cross section along the dotted line A-B in FIG. 3a to illustrate the contact areas of the two ferrules.

FIGS. 4a-4c show three embodiments of the invention with three different shapes of the ferrule end faces, whereby FIG. 4a corresponds to the embodiment illustrated in FIGS. 2 and 3.

FIG. 1a is a side cross sectional view of two connector pieces according to the invention coupled together such that light from an optical fiber in the first connector piece is transmitted into an optical fiber in the second connector piece. The first connector piece comprises a connector housing 3 and a ferrule 1 which projects from the housing 3 and which can be brought into contact with the ferrule 2 of the second connector piece. An optical fiber is arranged along the longitudinal axis 10 of both connector pieces, respectively, with end faces in the contact region 5. An important aspect of the invention consists in the shape of the end portions of the ferrule and the fiber in the contact region 5. This shape will be explained in more detail below with reference to FIGS. 2a-2c.

Figure 1A:
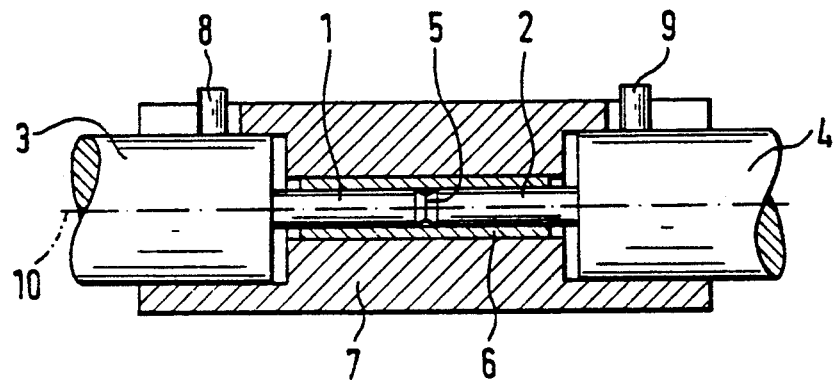
FIG. 1a is a cross sectional view of an optical connector system of the invention with two connector pieces coupled together.
Figure 1B:
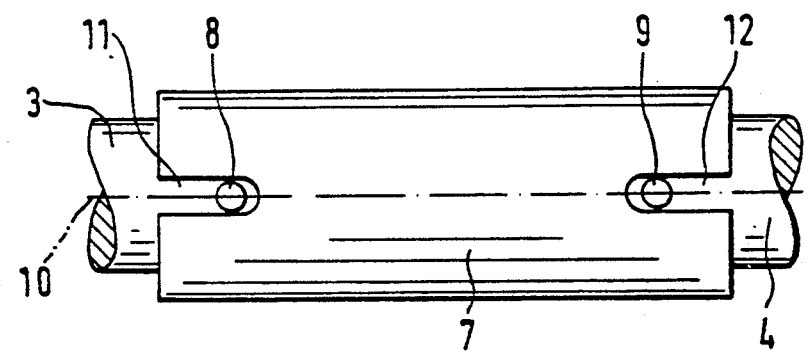
FIG. 1b shows the connector system of FIG. 1a in a top view.

The connector in FIG. 1a further comprises a cylindrical receptacle 7 having arranged along its center axis a sleeve 6 for guiding the ferrules 1 and 2 of the two connector pieces, respectively. The receptacle typically is provided with an external thread (not shown) and the connector pieces are surrounded by screwed caps (not shown) which can be screwed together with the receptacle on each side so that a tight connection of the two connector pieces is achieved. The connector housings 3 and 4 comprise projections 8 and 9, respectively, which fit into corresponding slots 11 and 12 of the receptacle 7. This is shown in FIG. 1b which is a top view onto the connector system shown in FIG. 1a. The projections 8 and 9, also denoted as "keys", have the purpose, together with the slots 11 and 12, to avoid a rotation of the connector pieces around the longitudinal axis 10.

The connector pieces may additionally comprise a springing, such that the ferrules 1 and 2 are urged together by a resilient force, thus always ensuring good contact of the two end faces. Such a resilient coupling of connector pieces is known as such, for example with optical connectors having plane-parallel end faces arranged at 90° relative to the axis of the optical fiber.

In principle, a connector according to the invention can be assembled from conventional components used in optical connectors having plane-parallel end faces arranged at 90° relative to the axis of the optical fiber, if only the ferrule and fiber end faces are designed in accordance with the invention. Since conventional parts can be used, the connector of the invention is inexpensive to manufacture.

Figure 2B:
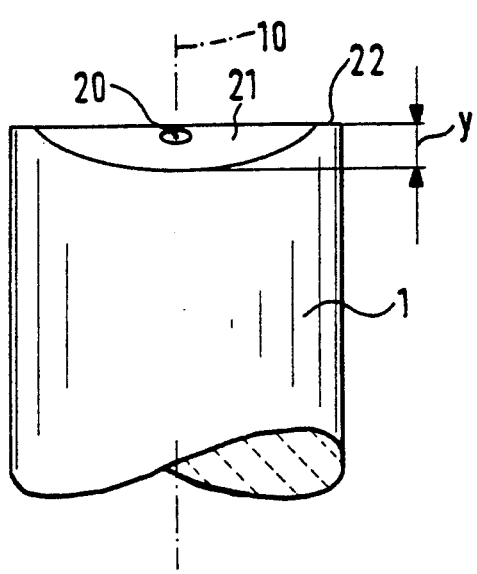
FIG. 2b is a side view of the piece shown in FIG. 2a turned by 90° around the axis of the optical fiber.
Figure 2A:
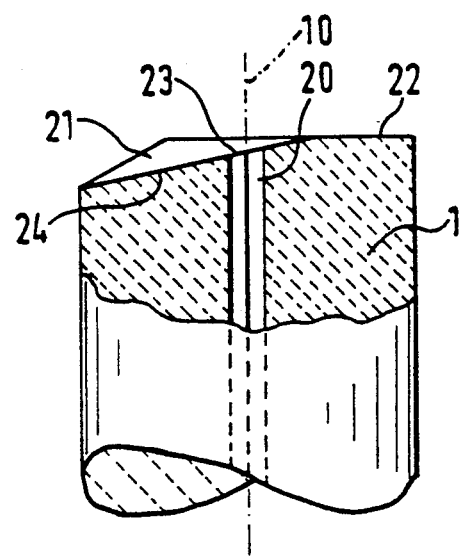
FIG. 2a is a cross section through the end piece of the ferrule of a connector of the invention.
Figure 2C:
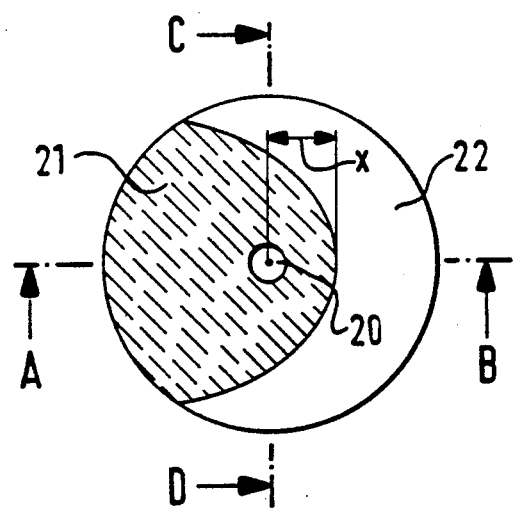

In FIGS. 2a-2c are shown detailed views of the shape of the end portion of the ferrule 1 in the contact region 5 according to FIG. 1a. Ferrule 2 has the same shape in the region 5 as ferrule 1 and is therefore not shown. An optical fiber 20 is arranged along the longitudinal axis 10 of the ferrule 1. The fiber may be, for example, glued to the ferrule 1. According to an important aspect of the invention, the end face of the cylindrical ferrule 1 comprises a recess 21 which extends beyond the center of the ferrule end face, i.e. the intersection of axis 10 with the end face. Thus, the end face 23 of the fiber 20 is set back a certain distance from the flat portion 22 of the end face.

FIG. 2c shows a top view on the ferrule end face for further illustrating the location of the recess 21 which is indicated by dashed lines. The flat portion 22 of the ferrule end face is contained in a plane which is perpendicular to the longitudinal axis 10 of the fiber 20. The recess 21 in FIG. 2c can be produced by a polishing process starting from a ferrule having an end face perpendicular to its longitudinal axis and a fiber arranged along the central axis of the ferrule with its end face flush with the ferrule end face. A cylindrical polishing tool rotating around its cylinder axis is used, whereby the axis of the polishing cylinder is tilted by a certain angle with respect to the plane containing the flat end face. Thus, the inclination of the line 24 in FIG. 2a corresponds to the tilt of the polishing tool. The line A-B in FIG. 2c illustrates the section shown in FIG. 2a.

FIG. 2b is a sectional view along the line C-D in FIG. 2c. It can be seen that the end face of the fiber 20 is located beneath the flat portion 22 of the ferrule 1. The cut along the line A-B in FIG. 2c corresponds to FIG. 2a.

FIG. 3a shows the contact region 5 of FIG. 1a in more detail. This drawing applies for a situation when the two connector pieces are connected to each other. The two ferrules 1 and 2 having the fibers arranged along their axes have identical shapes, but are rotated relative to each other by 180° with respect to the axis 10. That means, for example, that the recess in the first ferrule points upward and the recess of the other fiber points downward. The ferrules 1 and 2 are held together by the outer mechanical parts of the connector (not shown here). FIG. 3b schematically shows a cross section along the line A-B. It illustrates how the two ferrules are mating. The shaded areas 30 and 31 are those portions of the flat ferrule surfaces (22 for ferrule 1) which are in contact with each other. Since the two ferrules 1 and 2 have physical contact at the areas 30,31, the spacing between the fiber end faces is well-defined and exactly reproducible without requiring complicated spacing arrangements as in the prior art.

In a practical example of the invention, a standard connector having 2,5 mm ferrule diameter with the endface of the ferrule being perpendicular to the connector axis is polished by a cylindrical polishing tool having a diameter of 12 mm. The axis of the polishing cylinder is tilted by 6° with reference to the plane end face. The recess resulting from the polishing process extends 240 micrometers beyond the center of the connector (distance x in FIG. 2c). The recess has a maximum depth of 156 micrometers (distance y in FIG. 2b) and the fiber end face is set back by 25 micrometers from the plane end face. With such a connector, better than 50 dB return loss and better than 1 dB insertion loss can be achieved. The fiber in this example has a core diameter of 9 micrometers and a cladding diameter of 125 mm.

The ferrule in a connector of the invention may be of any suitable material, for example ceramic, or a mixture of ceramic with stainless steel, or a mixture of tungsten carbide and nickel-silver. The polishing tool is made of or is covered with a material sufficiently hard to produce the desired recess in the ferrule, such as diamond or aluminum oxide.

As shown in FIGS. 1a and 1b, the position of the ferrules 1, 2 relative to each other is fixed by means of the keys 8,9 and the slots 11,12. The end faces of the ferrules 1,2 are arranged opposite to each other in such a way that the recess 21 in ferrule 1 is rotated by 180 relative to the recess in ferrule 2. In other words, the two ferrules are arranged such that the end face 23 of the fiber 20 in ferrule 1 is substantially parallel to the opposing end face of the fiber in ferrule 2. An easy way to achieve this relative orientation of the ferrules is to apply the recess in the ferrule, i.e., the polishing axis, at 90° relative to the position of the key. With reference to FIG. 2c, this would mean that the key would be arranged in an angular position at the letter C or D. Such an arrangement has the advantage that standard receptacles having the two slots arranged in a line can be used, like the receptacle 7 shown in FIG. 1b. It is understood that besides keys and slots, any other means for keeping the opposing ferrules in fixed angular relationship can be employed.

FIGS. 4a-4c, alternative embodiments of the invention are shown besides the embodiment described above. FIG. 4a shows a side view and a top view of the above described connector wherein the recess 21 in the ferrule 1 has been produced by a cylindrical polishing tool whose polishing axis is tilted with reference to the ferrule end face. FIG. 4b shows an embodiment wherein an originally flat ferrule has been machined with a spherical polishing tool. Since the center of the sphere does not coincide with the axis of the fiber 2 (or the connector axis), it is ensured that the fiber end face has an inclination relative to the flat portions 22 of the ferrule end face. The shape of the recess shown in FIG. 4c can be machined. With a polishing wheel, for example a saw blade with diamond tooths. Since the center of rotation of the polishing wheel is not in line with the fiber axis, the fiber end face is provided with the required tilt. It is understood that various other shapes are possible by which the concept of the invention is realized that the fiber end face is tilted and set back from at least a portion of the surrounding ferrule.

Figure 5A:
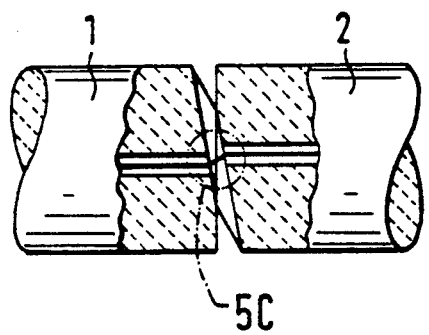
FIG. 5a is a side view of the two ferrule end pieces of a connector system of the invention, wherein the fibers of the two connector pieces are slightly misaligned relative to each other.
Figure 5B:
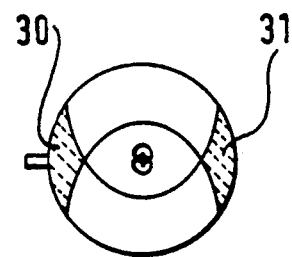
FIG. 5b is a cross section through the coupling region to illustrate the offset of the two fibers.
Figure 5C:
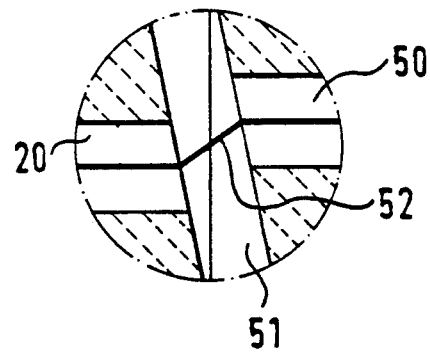
FIG. 5c is a magnified view of the coupling region of the two connector pieces.

An embodiment of the invention which can still further improve the connector performance regarding insertion loss will now be explained with reference to FIGS. 5a-5c. The elements shown in FIGS. 5a and 5b correspond to those in FIGS. 3a and 3b with the exception that in FIG. 5, the optical fibers are not arranged in the center of the ferrule 1 and/or the ferrule 2. FIG. 5c is a magnified view of the two end portions of the fibers 20 and 50 which are separated by an air gap 51. The fibers 20 and 50 are offset relative to each other. Light leaving the fiber 20 is refracted at the interface to the air gap 51 due to the differences in refractive index and the inclination of the fiber end face. Likewise, refraction occurs at the interface between the air gap 51 and the fiber 50. The resulting light path is schematically indicated by line 52. The misalignment in this case has the effect that a maximum of light intensity is transmitted from one fiber end face to the other, whereas in a case where the fibers 20 and 50 are aligned, the light refraction would cause a (although small) portion of the light leaving the first fiber to miss the second fiber.

The eccentricity of the fibers shown in FIG. 5c can either be produced intentionally by positioning the fiber outside the longitudinal axis of the ferrule, or it may be the case that the fiber is off-center due to manufacturing tolerances. In the latter case, the eccentricity of the fiber is determined and the polishing is then applied in such a way that an optimal light transition as illustrated in FIG. 5c is achieved. In particular, if the fiber is off-axis towards the right side, the recess in the ferrule end face is produced at the left side and vice versa (see FIG. 5a). Typical fiber offsets can be in the range of 1 micrometer.

We claim:

1. An optical fiber connector for joining an optical fiber to an optical fiber in an opposing connector, comprising a ferrule and an optical fiber surrounded by the ferrule, with the end face of the fiber being inclined with respect to a plane which is perpendicular to the longitudinal axis of the fiber and produced by a rotating polishing tool whose axis of rotation is inclined to said axis of said fiber, the ferrule having an end face comprising a portion projecting over the end face of the fiber in the direction of the fiber axis, but not being arranged in the same plane as the fiber end face, with the projecting portion forming a bearing surface for said opposing connector such that he two connectors can be brought into contact with each other and the opposing fiber end faces have a distance from each other when the connectors are in contact.

2. An optical fiber connector as in claim 1, wherein said projecting portion is a flat surface arranged in a plane which is perpendicular to the fiber axis.

3. An optical fiber connector as in claim 1, wherein the ferrule end face further comprises a recessed portion which extends beyond the position of the fiber and which is symmetrical about a symmetry line through the position of the fiber at the ferrule end face.

4. An optical fiber connector system comprising two identical connectors as defined in claim 1, wherein means are provided to hold the two connectors in a fixed position opposite to each other and at an angular displacement of about 180° with respect to the fiber axis.

5. A connector system as in claim 4, wherein said means to hold the two connectors in a fixed position and at an angular displacement of about 180 comprise keys fixed to housings of the connectors, respectively, at about 90° with respect to the symmetry line of the recessed portion of the ferrule end face.

6. An optical fiber connector system comprising:
a connector as defined in claim 2,
a connector wherein the end faces of the fiber and of the ferrule are in the same plane perpendicular to the fiber axis, and
means to hold the two connectors in a fixed position opposite to each other.

7. In a method for manufacturing a connector as in defined in claim 1, the step of polishing an optical fiber connector having its fiber end face and its ferrule end face arranged in the same plane perpendicular to the fiber axis, by means of a polishing tool, to remove a portion of the ferrule and of the fiber and to produce an inclined fiber end face.

8. A method as in claim 7, wherein: the polishing tool has cylindrical shape, the cylinder rotates during polishing around its cylinder axis, and this axis has an inclination with respect to a plane perpendicular to the fiber axis.

9. A method as in claim 7, wherein the polishing tool has spherical shape and the center of the sphere does not coincide with the fiber axis.

10. A method as in claim 7, wherein the polishing tool is a wheel which is furnished with abrasive material on its circumference.

* * * * *

UNITED STATES PATENT AND TRADEMARK OFFICE
CERTIFICATE OF CORRECTION

PATENT NO. : 5,082,378
DATED : January 21, 1992
INVENTOR(S) : Emmerich Muller and Michael Fleischer-Reumann It is certified that error appears in the above-identified patent and that said Letters Patent is hereby corrected as shown below:

Column 5, line 33, change "2" to --20--.

Column 5, line 37, after "machined", delete "." and change "With" to --with--.

Column 6, line 40, after "180" insert --°--.

Signed and Sealed this

Thirty-first Day of August, 1993

Attest:

BRUCE LEHMAN

Attesting Officer      Commissioner of Patents and Trademarks